US006895257B2

(12) United States Patent
Boman et al.

(10) Patent No.: US 6,895,257 B2
(45) Date of Patent: May 17, 2005

(54) PERSONALIZED AGENT FOR PORTABLE DEVICES AND CELLULAR PHONE

(75) Inventors: Robert Boman, Thousand Oaks, CA (US); Kirill Stoimenov, Santa Barbara, CA (US); Roland Kuhn, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 469 days.

(21) Appl. No.: 10/077,904

(22) Filed: Feb. 18, 2002

(65) Prior Publication Data
US 2003/0157968 A1 Aug. 21, 2003

(51) Int. Cl.[7] .............................................. H04Q 7/20
(52) U.S. Cl. .................... 455/556.1; 455/563; 709/206; 379/88.22; 379/88.16
(58) Field of Search ................................ 455/563, 466, 455/414.1, 556.1, 556.2; 709/206; 379/88.13, 88.14, 88.22, 88.23, 88.25, 92.03, 88.26, 88.17

(56) References Cited

U.S. PATENT DOCUMENTS 6,061,718 A * 5/2000 Nelson ........................ 709/206
6,212,408 B1 * 4/2001 Son et al. .................... 455/563
6,516,207 B1 * 2/2003 Gupta et al. ................. 455/563
6,708,021 B1 * 3/2004 Shim et al. ................. 455/90.1
6,751,299 B1 * 6/2004 Brown et al. ............. 379/88.18

* cited by examiner

Primary Examiner—Edward F. Urban
Assistant Examiner—Blane J. Jackson
(74) Attorney, Agent, or Firm—Harness, Dickey & Pierce, PLC

(57) ABSTRACT

Personalized agent services are provided in a personal messaging device, such as a cellular telephone or personal digital assistant, through services of a speech recognizer that converts speech into text and a text-to-speech synthesizer that converts text to speech. Both recognizer and synthesizer may be server-based or locally deployed within the device. The user dictates an e-mail message which is converted to text and stored. The stored text is sent back to the user as text or as synthesized speech, to allow the user to edit the message and correct transcription errors before sending as e-mail. The system includes a summarization module that prepares short summaries of incoming e-mail and voice mail. The user may access these summaries, and retrieve and organize email and voice mail using speech commands.

24 Claims, 5 Drawing Sheets

PERSONALIZED AGENT FOR PORTABLE DEVICES AND CELLULAR PHONE

BACKGROUND AND SUMMARY OF THE INVENTION

The present invention relates generally to speech recognition and speech synthesis. More particularly, the invention relates to a system and method for improving the text and audio messaging features of portable mobile communication devices, such as cellular telephones, personal digital assistants, and the like.

Mobile communication devices such as cellular telephones, personal digital assistants and portable radios, are convenient messaging devices that enable both voice and short text messages to be sent and received. However, these devices have several limitations. There is no convenient way to generate e-mail messages longer than a few sentences. This is particularly true with cellular telephones, which have small display screens and only rudimentary text input capability. Moreover, it is not practical to handle large quantities of incoming e-mail because of the limitations on both storage and character display. There is also no good way to archive and index voice messages and conversations.

The present invention overcomes these shortcomings by providing a system that integrates speech recognition and speech synthesis into these mobile communication devices. We call this system a personalized agent because it handles many of the user's speech and text processing tasks as a personal assistant or secretary might do if one were available. In its preferred embodiment, a server-based speech recognition helps generate text messages. The system will also allow a user to browse through e-mail that is stored on a server by generating search requests on the mobile device. The requests can be initiated by voice or by using the keypad or other input device. In another embodiment speech recognition is used to generate a transcription of a voice message or conversation. The transcription may then be used to index the audio file and the audio file itself can be stored on the server, allowing the user to access it at a later date.

For a more complete understanding of the invention, its objects and advantages, refer to the following specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention may be used to add speech processing capabilities to a variety of mobile communication devices. A cellular telephone will be used for illustration purposes here, although it will be recognized that the principles of the invention can be utilized in a variety of different mobile communication devices, including but not limited to, personal digital assistants (PDA), mobile radios, and the like.

Figure 1:
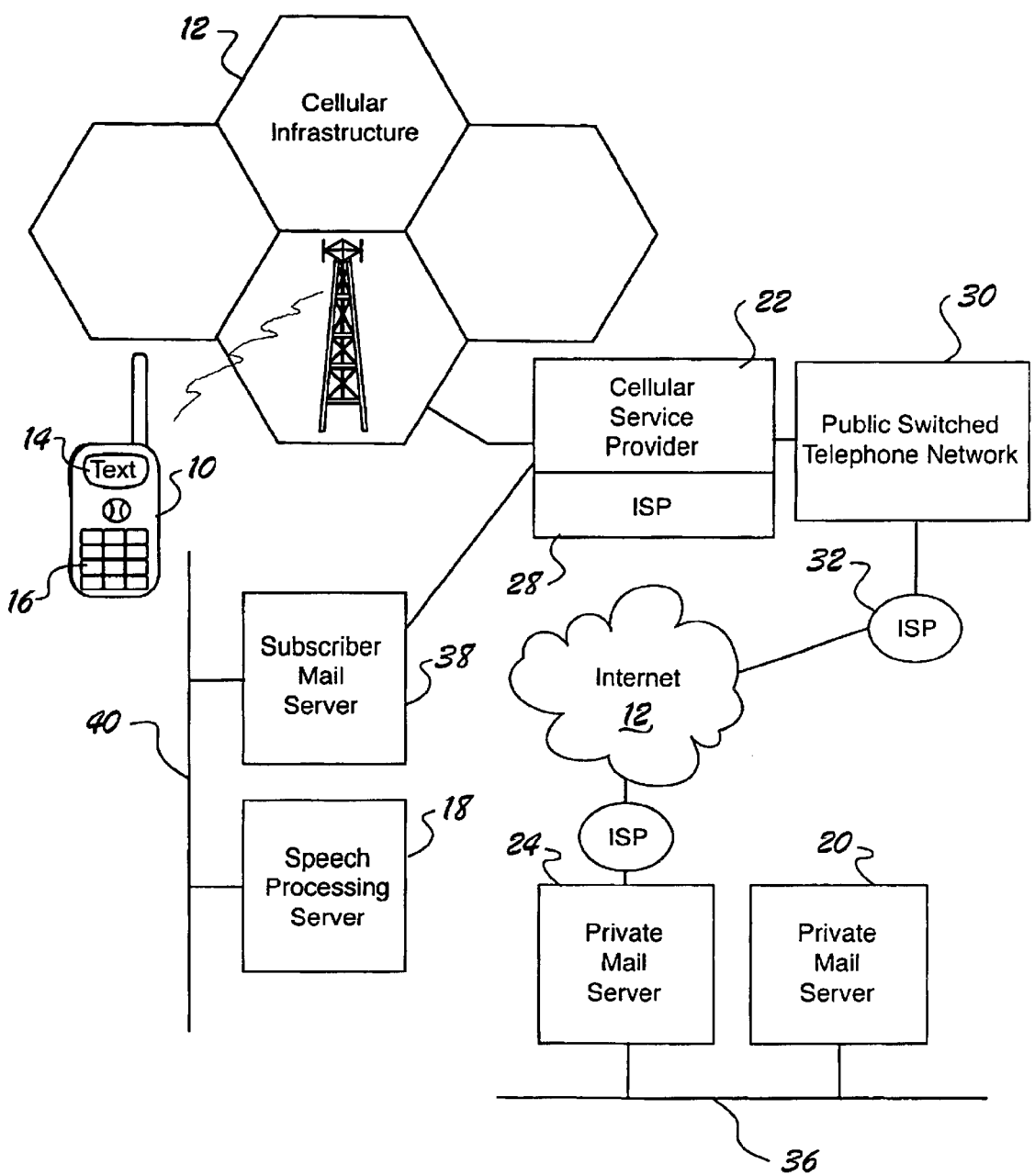
FIG. 1 is a block diagram illustrating an exemplary embodiment of the invention in a server-based distributed system.

A mobile communication device (cellular telephone) 10 is illustrated in FIG. 1. It communicates through the cellular infrastructure 12 generally as illustrated. In the presently preferred embodiments the mobile communication device, such as cellular telephone 10, has both voice and text capabilities. Text messages are displayed on display screen 14. The device can send and receive text data as well a voice messages. Voice messages are communicated through the mouthpiece (microphone) and earpiece (speaker) of the device. Text may be manually input by depressing buttons on keypad 16. Also, as will be more fully explained, text can be entered by using the speech processing services of the invention, in which case the user speaks the text that is desired to be input. This input speech can be in the form of continuous speech (e.g., dictation) or in the form of individual (discrete) words or by spelling by voice.

One common shortcoming of most mobile communication devices, including cellular telephone 10, is that the display screen 14 is comparatively small. While short text messages can be conveniently displayed on this screen, longer messages are problematic. Another attribute common to many mobile communication devices is a lack of processing power and memory. It is often not feasible to implement full-featured voice processing systems in the mobile communication device itself.

To address these issues, the preferred embodiment illustrated in FIG. 1 employs a speech processing server that handles much of the heavy computational burden associated with speech recognition and/or text-to-speech synthesis. In FIG. 1, two exemplary speech processing servers have been illustrated at 18 and 20. The speech processing server 18 is associated with facilities managed by the cellular service provider 22. Speech processing server 20 is associated with a private mail server system 24. Thus the speech processing server 18 illustrates how the invention might be implemented to provide speech processing services to a plurality of cellular customers. The speech processing server 20 illustrates how such services might be provided on a private or company-wide level.

Although any computer network may be used to implement the communication link between the mobile communication device and the speech processing servers, a particularly convenient implementation uses the internet 26 for such communication. Connectivity to the internet can be provided in a variety of ways. The cellular service provider 22 may offer internet service provider (ISP) services as illustrated at 28. Thus subscribers who wish to have internet access on their mobile communication devices (e.g., cellular telephone 10) may receive such services through ISP 28.

Typically the cellular service provider 22 is also connected to the public switched telephone network (PSTN) 30, which effectively couples the cellular infrastructure users to the public switched telephone infrastructure. Access to the internet 26 may therefore be had by utilizing services of an independent ISP 32 via dial-up connection over the public switched telephone network 30.

Once the mobile communication device is coupled to the internet, it opens up a variety of different communication possibilities, including email. While there are a variety of different e-mail server standards in popular use today, none of them have heretofore fully supported access using portable communication devices such as cellular telephones. For illustration purposes, two mail server systems are illustrated in FIG. 1. The private mail server 24 communicates with the internet 26 through an ISP 34. The speech processing server 20 works in conjunction with the private mail server. Although not required to be connected in this fashion, a typical embodiment would connect the speech processing server with the private mail server using a suitable local area network connection 36.

FIG. 1 also illustrates a subscriber mail server 38 which may be placed in communication with speech processing server 18 over a suitable local area network connection 40. The subscriber mail server 38 is associated with the cellular service provider 22 and may be coupled to the internet using the ISP services 28 of the cellular service provider.

Figure 2:
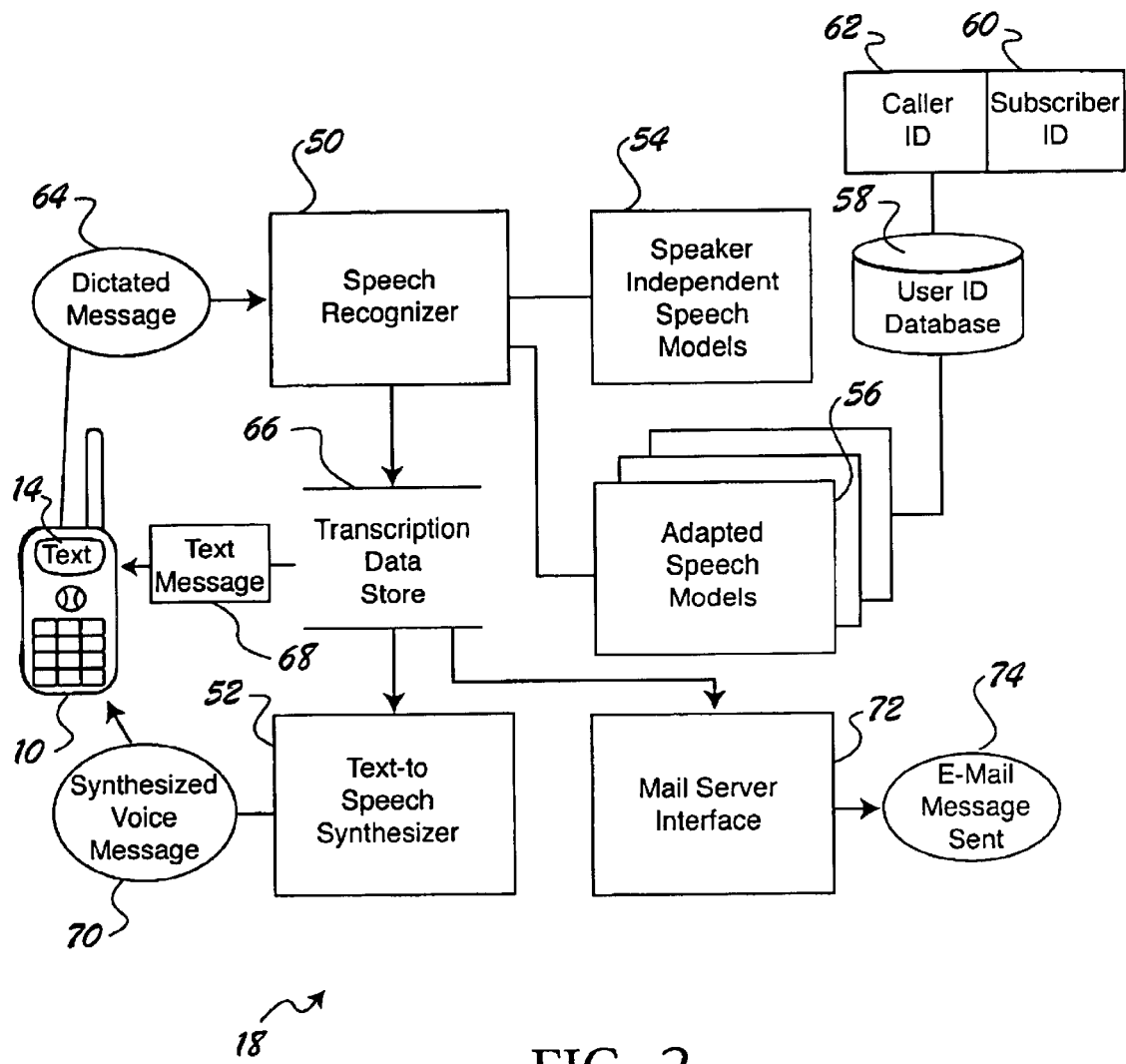
FIG. 2 is a block diagram illustrating details of the speech processing server, useful in understanding how e-mail messages may be constructed, edited and sent using a mobile communication device such as a cellular telephone.

FIG. 2 illustrates certain components of the speech processing server (server 18 and server 20) in greater detail. Specifically, FIG. 2 shows those components of the speech processing server involved in the email creation, editing and sending process.

Referring now to FIG. 2, the system components used for composing and sending an e-mail message will now be described. Specifically, FIG. 2 illustrates some of the components of the presently preferred speech processing server (such as servers 18 and 20 of FIG. 1). In the preferred system, both a speech recognizer 50 and a text-to-speech synthesizer 52 are employed. The speech recognizer works in conjunction with a set of speech models that are used to provide the recognizer with a set of data representing the sound units recognizable by the speech recognizer.

In the presently preferred embodiment the recognizer employs a data store containing speaker independent speech models 54 and one or more sets of adapted speech models 56. The speaker independent models are designed to provide good recognition across a wide speaker population. The speaker independent models are used when there are no specifically adapted speech models for an individual user. The adapted speech models 56 are tuned to an individual user's speech.

While there are a variety of different ways of constructing the adapted speech models, one presently preferred embodiment uses the speaker independent speech models as a starting point. These models are then adapted through interaction with a given user. The user is prompted to utter a predetermined phrase or sentence (supervised adaptation) and the system then correlates the user's utterance to the prompted phrase or sentence. In the alternative, unsupervised adaptation may also be implemented. After correlating the utterance to the phrase or sentence, the system selectively adjusts one or more of the speaker independent model parameters to improve the likelihood that the adapted models will recognize the phrase or sentence uttered. The adapted models are stored at 56, preferably as part of the user identification database 58. The user identification database defines a relationship or association between the user's identifier (such as an assigned subscriber identifier 60 or the user's telephone number, which may be obtained using the telephone caller ID 62).

The system will automatically retrieve the appropriate adapted speech models 56 for a given user by first ascertaining the user's subscriber ID or caller ID and then retrieving the corresponding set of adapted speech models from the user ID database 58.

When the user wishes to dictate an e-mail message for sending over a computer network such as the internet, the user uses the cellular telephone (or alternatively any suitable device that communicates with the speech processing server). A dictated message 64 is provided and submitted to speech recognizer 50 for conversion into text. The text transcript of the dictated message is stored in a transcription data store 66, which may be implemented using a computer memory. The transcription data store thus contains an initial text message 68, which may be sent back to the user's portable device (e.g., cellular telephone) for display upon the display screen 14. To accommodate systems which do not have a suitable display screen, the contents of transcription data store 66 may also be sent to the text-to-speech synthesizer 52, which converts the text message into a synthesized voice message 70 that is then sent back to the device 10 for replay through the speaker or earpiece.

Providing the user with both visual and audible replay of the transcribed message gives the user an opportunity to verify that the dictated message was correctly transcribed. If there are any errors or changes required, the user enters an edit mode on the device which allows the user to edit the message. In the presently preferred embodiment the user can edit selected words by highlighting them on the display screen and then making changes to the highlighted selection by data entry through keypad 16, or by re-dictating the highlighted selection or by spelling the corrected dictation by voice. In the spell-by-voice editing mode, the user spells his or her corrections to the highlighted selection by speaking the spelled correction, letter-by-letter.

To accommodate systems that do not have a suitable display screen, the user can "select" a given portion of the synthesized voice message in the audio domain by depressing selection keys on the device at points in time immediately preceding and immediately following the synthesized voice message portion to be edited. In one embodiment, the system places short audible tones at these edit points, so that the user can hear where he or she has placed the edit delimiters before undertaking the editing process.

Once the user is satisfied that the transcription data store 66 contains the e-mail message to be sent, the user depresses the send key on the device, causing the contents of the transcription data store 66 to be flushed to the mail server interface 72. The mail server interface then handles the details of sending the transcribed message as an e-mail message as at 74.

Figure 3:
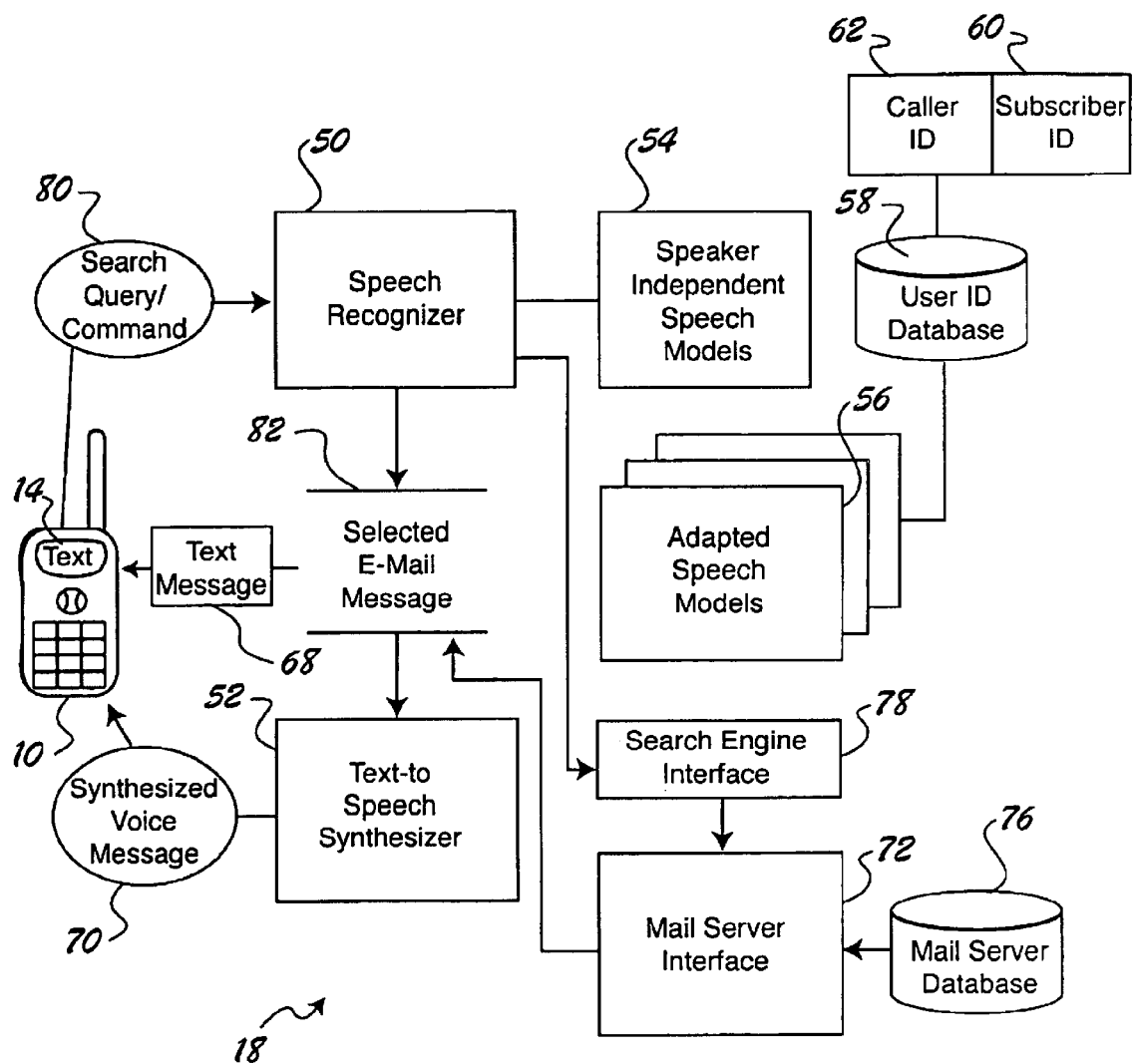
FIG. 3 is a block diagram showing details of the speech processing server useful in understanding how e-mail messages and other text content can be searched for and retrieved from a server-based system using a mobile communication device such as a cellular telephone.

The speech processing server 18 is also capable of retrieving email messages for audible and text presentation to the user of the device 10. Components for providing this functionality in the presently preferred embodiment are shown in FIG. 3. Many of the components have been previously discussed in connection with the e-mail message dictation feature illustrated in FIG. 2. Unless otherwise noted, those components provide the same functionality for the e-mail retrieval and presentation functions depicted in FIG. 3.

Specifically, the mail server interface 72 is placed in communication with mail server database 76. The mail server database can be physically located at the same site as the speech processing server (such as part of the subscriber mail server 38 or private mail server 24 of FIG. 1). However, physical location of the mail server database is not a requirement. The invention may be implemented in configurations where the mail is stored anywhere that is accessible by the mail server interface 72.

Associated with the mail server interface is a search engine interface 78. The search engine interface is in turn coupled to speech recognizer 50. When a user wishes to retrieve an e-mail message for presentation on device 10, the user enters a search query or command phrase 80 by speaking into the device as at 80. The speech recognizer 50 then decodes the uttered query or command and sends it to the search engine interface 78. Alternatively, the user can enter search queries by pressing buttons on the keypad of the device, or by writing the commands as electronic ink symbols on a digitizing input tablet, if such is provided in the handheld device. Digitizing input tablets are common to many handheld personal digital assistants (PDAs) and are expected to become popular in cellular telephone devices as well.

In the keypad entry mode, there are several ways to decode the user's input. One embodiment uses the alphabetic letters on the standard telephone touch tone keypad. On such keypads there are typically three alphabetic letters assigned to each button. The user controls which of the three letters is input by the number of times he or she presses the key. For example, the '2' button is assigned letters A, B and C. To input the letter 'A' the user presses '2' one time; to input the letter 'B' the user presses '2' twice; to input the letter 'C' the user presses '2' three times.

An alternate embodiment for keypad entry uses the key encoding scheme described in U.S. Pat. No. 6,246,983, entitled "Text to Speech E-mail Reader with Multi-Modal Reply Processor," issued to Zou, et al and assigned to the assignee of the present invention. That embodiment includes an ASCII encoder system that allows an e-mail message to be composed and addressed using the full ASCII character set, entered through a special technique using the touch tone phone's numeric keypad. Most ASCII characters are defined by a two-button sequence, allowing for entry of both upper case and lower case letters as well as punctuation symbols. Thus the ASCII encoder system allows a user to enter any valid e-mail address, even though the address includes one or more ASCII punctuation characters not found on the touch tone keypad.

Although not shown, the uttered or hand-entered search query or command may be optionally displayed as a text message or repeated as a synthesized voice message in the same fashion as a dictated message was provided to the user for editing as shown in FIG. 2. Thus the user is able to edit and correct any search queries or commands before they are sent to the search engine interface 78.

Once received by the search engine interface, the search engine associated with the mail server interface examines the contents of the mail server database to ascertain whether any mail messages stored there are applicable to the user's query or command. For example, the user may wish to select for presentation all e-mail messages from a particular source. The user would speak a suitable command such as, "Retrieve all e-mail messages from Keri." The speech recognizer would convert the spoken request into a text string which is then fed to the search engine interface 78 for parsing.

The presently preferred search engine interface uses a frame-based natural language parser that will extract the semantic content or meaning of the input command. In this case, the natural language parser would identify the command "Retrieve" as instruction to search for and retrieve records from database 76. It would parse the words "from Keri" as a search criteria or search constraint, namely that all e-mail messages from the identified sender "Keri" are to be retrieved.

The mail server 72 acts upon the parsed command by retrieving the selected e-mail messages from the server and supplying them, preferably sequentially, to the e-mail message data store 82. From data store 82 each email message can be displayed as a text message 68 upon display screen 14, or provided as a synthesized voice message 70 using the services of text-to-speech synthesizer 52.

Figure 4:
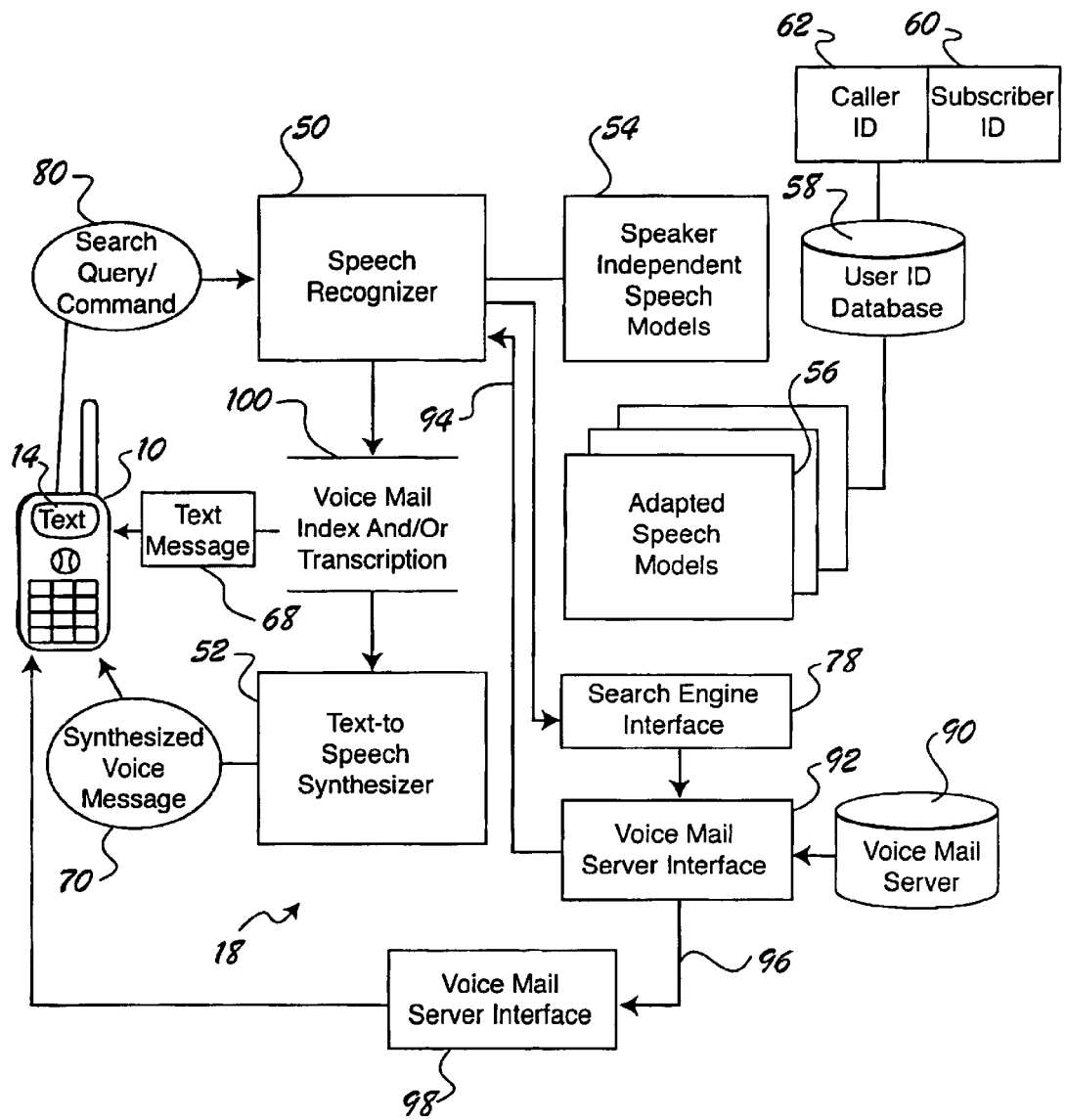
FIG. 4 is a block diagram of components of the speech processing server useful in understanding how voice-mail messages and other audio content can be transcribed, indexed and displayed on the mobile communication device.

The capabilities of the preferred embodiments heretofore discussed have related primarily to e-mail sending and retrieving. However, the architecture of the presently preferred speech processing server 18 can readily be extended to non-text messaging as well. To illustrate this capability, FIG. 4 shows how the speech processing server 18 can be used to provide an interface to a voice-mail server such as voice-mail server 90. The speech processing server 18 includes a voice-mail server interface 92 that is coupled to search engine interface 78. The user can enter search queries or commands 80, essentially as described in connection with FIG. 3. These commands are processed by speech recognizer 50 and then fed to search engine interface 78 for parsing and constructing a suitable search query. The search query is then supplied to the voice-mail server interface 92, which retrieves the requested voice-mail message and supplies the audio stream via connection 94 to the speech recognizer 50. The voice-mail server interface 92 also forwards or routes the audio stream over connection 96 to the user's portable device 10 via the telephone infrastructure shown diagrammatically at 98. This infrastructure would include any applicable public switched telephone network and any applicable cellular infrastructure as illustrated in FIG. 1.

The voice-mail server interface 92 thus provides the selected voice-mail message over two paths, one leading directly to the user's portable device 10 and the other to speech recognizer 50. Using the portable device's speaker or earpiece, the user is thus able to hear the selected voice-mail message as it was originally saved in the voice-mail server 90. The voice-mail message is also processed by speech recognizer 50 to provide a voice-mail index and/or transcription for storage in data store 100. The voice-mail index and/or transcription comprises a text message 68 which can be displayed on the display screen 14. The voice-mail index may be generated, for example, by using the natural language parser services of the search engine interface to extract suitable index information, such as the name of the caller and the topic of the call. The index may also include a numeric indicator corresponding to the length of the message. This length indicator may be suitably derived from the file size of the retrieved voice-mail message.

One particularly useful embodiment of the invention employs a rule-based system for handling how messages are presented. The rule-based system may be implemented as a plurality of rules. Each rule contains three main parts: a condition, a message, and an action. The condition describes when the rule should be activated, based on such information as time, caller id information, location etc. The message is a textual representation of the message that will be played back and may include variables like caller name, time, location etc. The action is an action that is be performed. Examples of such actions include: accept call, reject call, forward call to a certain number or a voicemail system, place a call a certain number etc.

The rules can be generated in a variety of ways. In one preferred embodiment rules are generated using one or more of the of the following approaches: (a) manually generated/ edited by the user (b) in combination with use of PIM (Personal Information Management) software, and/or (c) suggested by some a software or human agent that monitors the user's activity.

Figure 5:
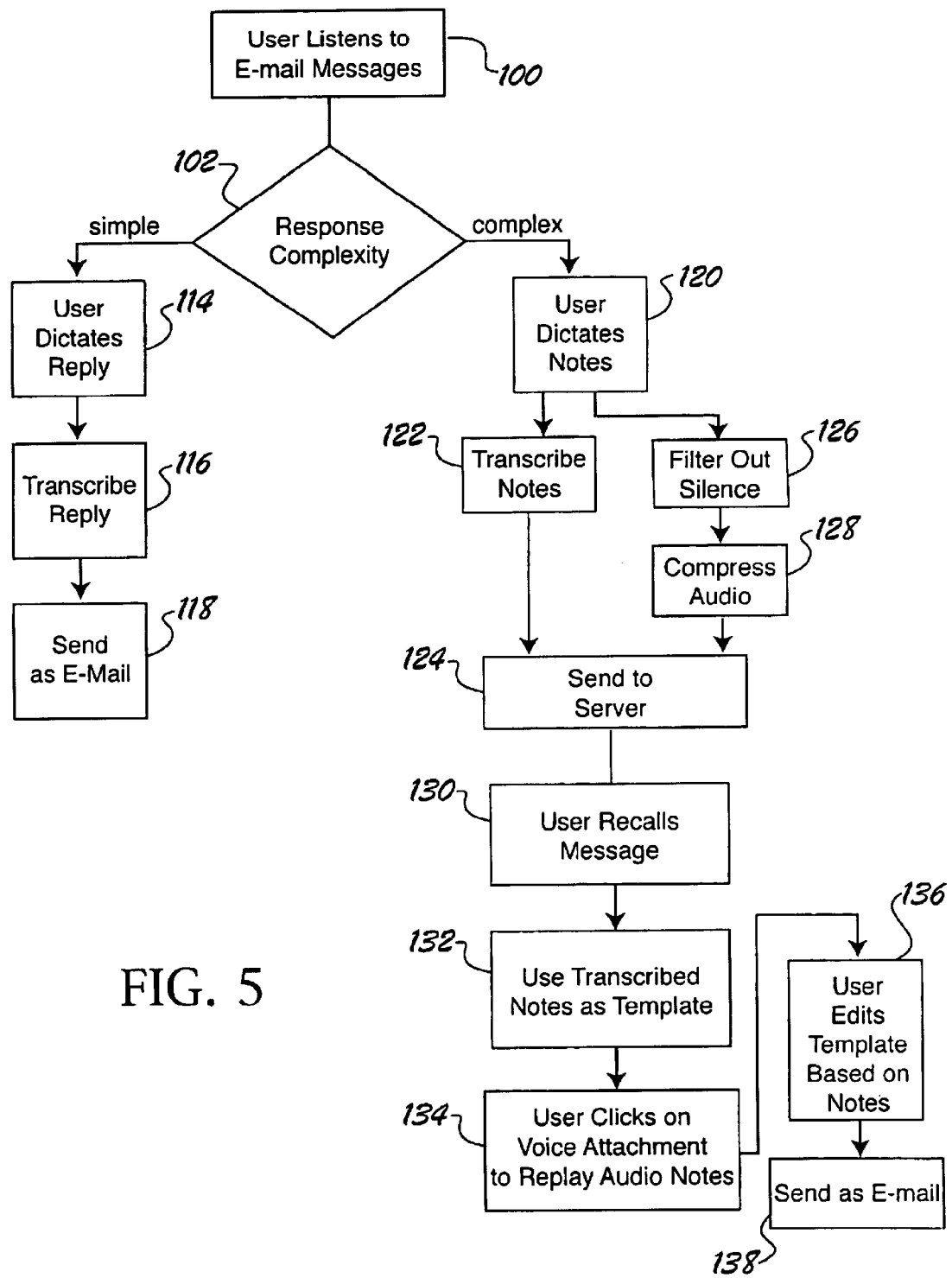
FIG. 5 is a flowchart diagram illustrating how the invention may be adapted to serve as a productivity tool.

Yet another embodiment of the invention provides a productivity tool that will allow the user to listen to e-mail messages, and prepare a suitable response even under noisy conditions where the speech recognizer may perform numerous recognition errors. FIG. 5 illustrates this embodiment.

Referring to FIG. 5, assume that the user is listening to e-mail messages being played back through the handheld mobile device as at step 110. If the e-mail message is suitable for a short or simple reply, the user may elect to dictate such reply, making any necessary corrections to fix recognitions errors. On the other hand, if the e-mail message requires a more complex reply, the user may elect not to attempt to dictate a suitable reply to be sent during the current session. Instead, the user may elect to dictate notes of how he or she intends to respond to the complex e-mail message, saving those notes for later.

Thus, the user ascertains the relative complexity of the required response at step 112. If a simple response can be composed, the user dictates it at step 114, whereupon the system transcribes the reply at step 116 (using the techniques described above). The transcribed reply is then sent as an e-mail message at step 118, preferably during the e-mail reading session or shortly thereafter.

If the response is deemed to be too complex for a simple reply, the user can instead elect at step 112 to merely dictate user notes as indicated at step 120. These notes could include, for example, portions of an e-mail reply that may be sent at a later time. Thus the user could indicate to whom the reply should be sent, the subject that would be included in the subject line or "regarding" line of the e-mail message, together with any other simple communications the user may wish to include. In addition, the user can also dictate his or her notes, thereby preserving the user's thought processes and ideas on how the complex e-mail message may be responded to. These user-dictated notes are transcribed at step 122 so that they may be sent to the server at step 124 for subsequent access by the user. In addition, the user's dictated notes are also stored as digital audio data in association with the transcribed notes. In the presently preferred embodiment, the user's dictated notes are processed to filter out long gaps of silence (non-speech) as at 126. Filtering out silence makes it easier for the user to replay these notes at a later time, because he or she does not need to wait during the non-speech gaps. After filtering, the audio data can be compressed at 128 using any suitable audio compression algorithm. Compression is presently preferred because it reduces the size of the digital audio file and reduces the amount of time required to send it to the server.

It will be appreciated that the productivity tool of this embodiment allows the user to respond to e-mail messages in whatever way seems most appropriate at the time, given the user's current preparedness and given any possible speech recognition constraints imposed by a noisy environment. Thus the user could, for example, handle many e-mail messages while driving in the car or waiting in line.

Any e-mail message responses that are not immediately sent as e-mail replies at step 118 are available for further processing by the user at a later time. The user does this at step 130 by recalling the e-mail message and its associated previously dictated notes. While the user could access this information using the mobile communication device, another scenario involves using a personal computer communicating with the server. The user could, for example, recall the previously saved messages with user-dictated notes attached and then manipulate them using his or her computer at the office or at home.

When manipulating the recalled messages, the user is able to use the transcribed notes generated at step 122 as a template for preparing a reply to the e-mail message, as illustrated at 132. If there are numerous recognition errors in a particular section of the dictated notes, the user can simply delete them and supply new text. Where the transcribed notes are useful, however, the user may keep them. In addition, the user can clip on a voice attachment icon associated with the transcribed notes as indicated at step 134. This causes the system to replay the digital audio voice attachment associated with the transcribed notes. In this way, the user can be reminded of his or her thoughts on how to respond to the message. Based on these thoughts, the user can further edit the transcribed notes as at 136. Once the user is satisfied with the final edited product, it can be sent as an e-mail message at step 138.

Yet another use of the personalized agent as a productivity tool is to use the portable device to dictate e-mail messages, memoranda and "notes-to-self" that may not necessarily be in reply to an incoming e-mail or voice mail message. Thus, the device may be used to generate many different types of messages, memoranda and reminders that are then transcribed and also stored as audio data.

A further embodiment of the personalized agent involves the application of tags, labels and macro commands (hereinafter generally referred to as tags) to an e-mail or voice mail message. The tags may me added by either voice command or by manipulating keypad buttons on the portable device. Such tags would then be attached to or associated with a particular message. For example a user could "tag" a message by speaking the word "important" and the system would apply an "important" tag to that message. Later, when reviewing messages, the user could see that this one was labeled as important. Of course, tags can be applied to newly dictated messages as well as replies to incoming voice mail or e-mail.

As discussed above a tag can be presented as text associated with a given message. However, other uses of tags are also envisioned. Tags can be used to automatically route the message to a particular file, or to forward the message to a particular destination or recipient. The user may, for example, use such tags to invoke macro commands capable of performing multiple tasks. For example, the user could construct a macro that would send or forward a given message to a list of mail recipients.

To implement the tags feature, the presently preferred embodiment is configured to recognize certain keypad commands and/or voiced commands as serving a tagging function. These may be stored in the system, either in the portable device or on a server that communicates with the portable device. In effect, pressing a predetermined keypad button (or sequence of buttons) or speaking a predetermined command is treated by the system as constituting an instruction to attach a tag to the message currently being processed. In one embodiment, these tags are predefined by the user and stored for later use. In a more powerful embodiment, the system employs a tag creation command by which the user can define new tags, "on the fly," as the system is being used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A personal messaging device comprising:

a hand held mobile device having an audio receiver and an audio transmitter, said audio receiver operable to receive input audio signals, and said audio transmitter operable to transmit output audio signals;

a speech recognizer operable to convert said input audio signals into recognized words;

a mail interface module coupled to said speech recognizer for managing mail messages based on said recognized words;

a speech editor, said speech editor providing a means for editing a segment of said output audio signals or said input audio signals;

said speech editor allowing a user to select a segment of said audio signals; and said speech editor further allowing a user to alter said segment of said audio signals.

2. The apparatus of claim 1 wherein said mail messages are e-mail text messages.

3. The apparatus of claim 1 wherein said mail messages are voice messages.

4. The apparatus of claim 1 wherein said speech recognizer resides in a remote location independent of said hand held mobile device.

5. The apparatus of claim 1 wherein:

a user selects said segment of said audio signal by indicating a beginning and an end point of said segment; and said speech editor provides a user interface communicating with said hand held mobile device through which a user selects said beginning and end points of said segment by keypad or voice inputs.

6. The apparatus of claim 5 wherein said speech editor includes means for providing a user with a modified audio signal, said modified audio signals identifying said segment that the user selected for editing, said modified audio signal identifying said beginning and end points of said segment with short audible tones.

7. The apparatus of claim 1 wherein said speech editor provides the contents of said audio signal to the hand held mobile device as a text message based on said recognized words.

8. The apparatus of claim 7 wherein a user edits said text message through keypad inputs.

9. The apparatus of claim 1 wherein the input audio signal is a voice input from a user.

10. The apparatus of claim 1 wherein the input audio signal is an audio conversation communicated using the hand held mobile device.

11. The apparatus of claim 1 wherein the output audio signal is synthesized speech.

12. A personal messaging device comprising:

a hand held mobile device having an audio receiver and an audio transmitter, said audio receiver operable to receive input audio signals, and said audio transmitter operable to transmit output audio signals, said hand held mobile device in communication with a mail storage database;

a speech recognizer operable to convert said input audio signals into text;

a text to speech synthesizer operable to convert said text into output audio signals;

a search engine interface in communication with said speech recognizer, said search engine interface operable to receive verbal or textual search queries from a user, said search engine interface further operable to retrieve a text or voice message from said mail storage database based on said search queries; and a message summarizer, said summarizer operable to receive said retrieved messages from said search engine interface, said summarizer further operable to extract a summary of the contents of said messages.

13. The apparatus of claim 12 wherein said search engine interface is operable to return said retrieved message to a user in the form of text or synthesized speech.

14. The apparatus of claim 12 wherein summaries are provided to the user in the form of a text message or as synthesized speech.

15. The apparatus of claim 12 wherein retrieved message is an electronic mail or text message.

16. The apparatus of claim 12 wherein said retrieved message is a voice message or a recorded voice conversation.

17. A method for inputting speech into a hand held mobile device having an audio receiver and an audio transmitter, wherein the input speech is returned to the device in the form of text or synthesized speech for the purpose of review and correction by the user, the process comprising steps of:

transmitting said input speech to a speech recognizer;

converting said input speech into a text message;

converting said text message into synthesized speech;

transmitting said synthesized speech to a user;

selecting a segment of the message based on voice or keypad inputs from a user, the inputs indicating the beginning and end points of the desired segment;

replaying the message to the user with audible tones inserted at the points selected by the user;

receiving an indication from the user that the selected segment of the message is correct; and editing the selected segment by allowing the user to input speech to replace the selected segment.

18. The method according to claim 17 further comprising the step of providing the message to a user in the form of a text message.

19. The method of claim 17 further comprising the step of editing the selected segment by allowing the user to input text to replace the selected segment.

20. The method of claim 17 further comprising the step of transmitting the edited message as synthesized speech or text.

21. A method for retrieving a summary of a stored electronic mail or text message using a hand held mobile device having an audio receiver and an audio transmitter, wherein the message is returned to the device based on an audio search query input by a user, the process comprising steps of:

transmitting the audio search query to a speech recognizer;

converting audio query into a text query;

interfacing with a search engine;

searching a mail database with the search engine;

retrieving an electronic mail or text message from the mail database based on the search query;

extracting a summary of the contents of the message;

converting the summary of the message into synthesized speech; and transmitting the summary of the message to the hand held mobile device in the form of synthesized speech.

22. The method according to claim 21 further comprising the step of transmitting the summary of a message to the hand held mobile device in the form of a text message.

23. A method for retrieving a summary of a stored voice conversation or voice message using a hand held mobile device having an audio receiver and an audio transmitter, wherein the message is returned to the device based on an audio search query input by a user, the process comprising steps of:

transmitting the audio search query to a speech recognizer;

converting audio query into a text query;

interfacing with a search engine;

searching an audio database with the search engine;

retrieving a voice conversation or voice message from the audio database based on the search query;

extracting a summary of the contents of the voice conversation or message;

converting the summary of the message into synthesized speech; and transmitting the summary of the message to the hand held mobile device in the form of synthesized speech.

24. The method according to claim 23 further comprising the step of transmitting the message to the hand held mobile device in the form of a text message.

* * * * *